United States Patent

[11] 3,557,655

| [72] | Inventor | William H. Coe |
| | | Rockford, Ill. |
| [21] | Appl. No. | 838,983 |
| [22] | Filed | July 3, 1969 |
| [45] | Patented | Jan. 26, 1971 |
| [73] | Assignee | Keystone Consolidated Industries, Inc. |
| | | Peoria, Ill. |
| | | a corporation of Delaware |

[54] EXTRUDED THREAD-CUTTING NUT
7 Claims, 7 Drawing Figs.

[52] U.S. Cl. .................................................... 85/32, 151/21
[51] Int. Cl. .................................................... F16b 29/00
[50] Field of Search ......................................... 85/32(Int.), 32; 151/21A, 21C, 22, 38, 20, 41.75

[56] References Cited
UNITED STATES PATENTS

| 2,326,285 | 8/1943 | Burke | 151/21C |
| 2,723,584 | 11/1955 | Parker | 85/32Int. |
| 3,350,975 | 11/1967 | Bien | 85/32 |
| 3,388,732 | 6/1968 | Holton | 151/21C |
| 3,501,995 | 3/1970 | Lanius | 85/32Int. |

FOREIGN PATENTS

| 835,353 | 5/1960 | Great Britain | 85/32Int. |
| 641,325 | 4/1928 | France | 151/21C |

Primary Examiner—Marion Parsons, Jr.
Attorney—Wilson and Geppert

ABSTRACT: An extruded thread-cutting nut for the forming of threads on an unthreaded post or stud which is a one-piece nut having an extruded body provided with internal threads therein, a body flange integral with and positioned at one end of the extruded body, and a face flange parallel to and joined to the body flange by a short sidewall. The face flange is provided with a central aperture aligned with the nut body and incorporates therein a helical thread provided with one or more cutting edges. An unthreaded stud first engages the cutting edge and thread in the face flange to form the thread and then engages the interior threads of the nut body.

PATENTED JAN 26 1971
3,557,655
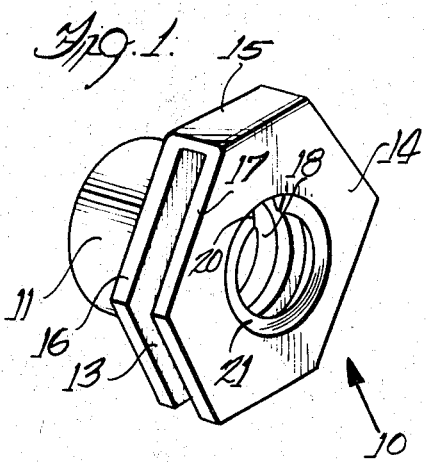
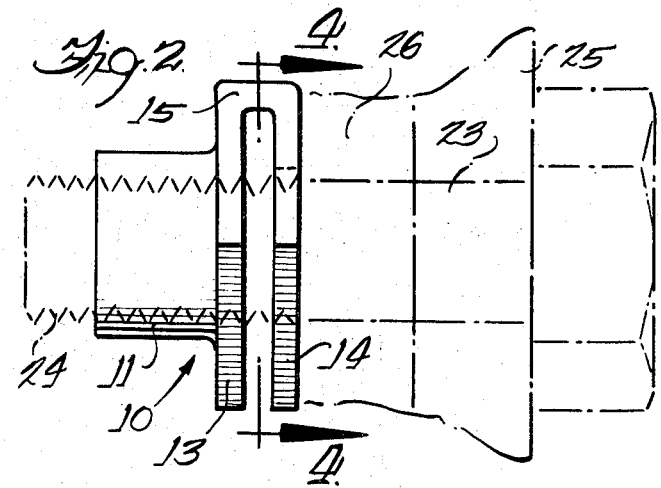
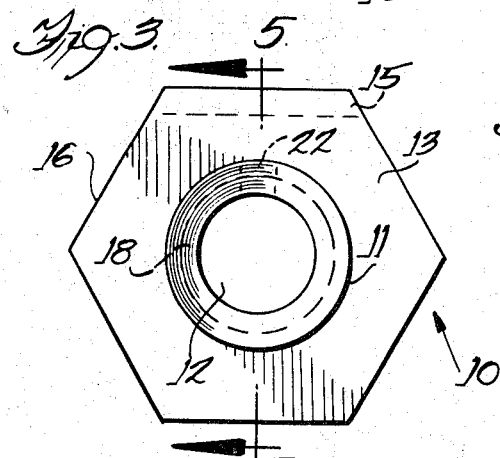
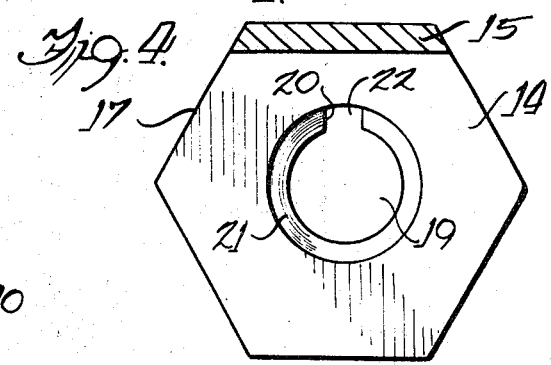
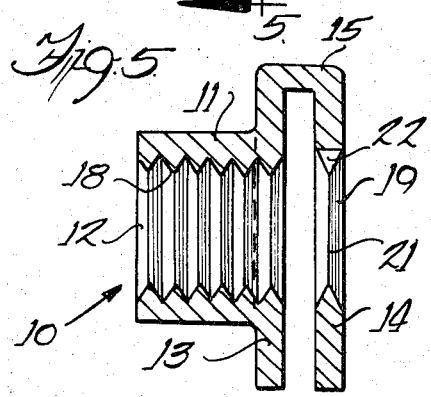
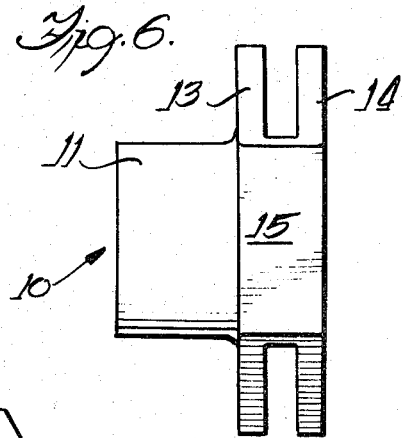
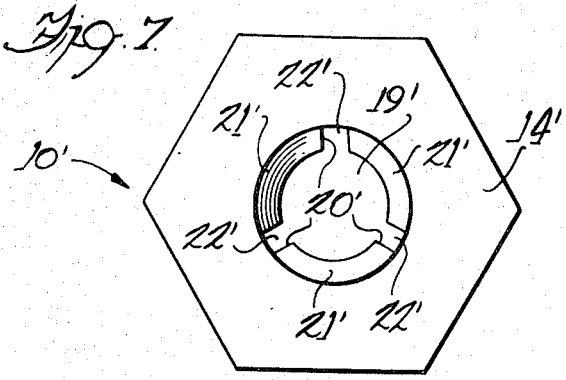
Inventor
William H. Coe
by Wilson & Geppert
Atty's

EXTRUDED THREAD-CUTTING NUT

The present invention relates to an extruded thread-cutting nut, and more particularly to a one-piece thread-cutting locknut which is capable of cutting its own threads on an unthreaded post or stud.

Among the objects of the present invention is the provision of an extruded thread-cutting nut capable of cutting its own threads on an unthreaded die-cast post to accomplish a complete threaded fastening without the use of thread-cutting or thread-forming tools or devices. The nut is capable of performing the thread-cutting operation where the die cast post or stud is plated with very hard and corrosion-resistant materials, such as chromium, and requires less torque than present thread-cutting methods. The nut will cut a thread of standard pitch and size to be interchangeable with standard nuts, and the nut can be applied to standard threaded items, such as threaded studs, threaded bolts, etc.

Another object of the present invention is the provision of a one-piece thread-cutting nut which is self-locking without the use of compounds or other devices. The nut includes a threaded nut body with a body flange and a thread-cutting flange joined to the body flange by a sidewall. When the nut is installed there is interaction between the body flange, the sidewall and the face flange to provide a distortion of the parallelarity of the flanges which causes the axis of the nut to distort the axis of the stud. This self-locking action does not require the increasing of the torque beyond the normal forces required to drive and set a fastener of this type.

A further object of the present invention is the provision of a thread-cutting nut which when assembled provides several circumferences of thread engagement which increases the difference greatly between driving and stripping torque and thereby decreases the number of failures of installation during assembly work.

The present invention also comprehends the provision of a thread-cutting nut which provides a stress distribution on a greater number of circumferences of thread engagement, reduces stress concentration on the item to which it is fastened, and thereby increases the reliability and strength of an assembly in which it is used.

The present invention further comprehends the provision of a thread-cutting nut that provides a large contact area that enables the assembly of thin material or materials without buckling or causing damage or an unsightly fastening of such materials, and the distinct nut periphery tends to eliminate slipping of the cooperating tool.

Further objects are to provide a construction of maximum simplicity, efficiency, economy and ease of operation, and such further objects, advantages and capabilities as will later more fully appear and are inherently possessed thereby.

In the drawing:

FIG. 1 is a perspective view of the extruded thread-cutting nut of the present invention;

FIG. 2 is a side elevational view of the thread-cutting nut;

FIG. 3 is an end elevational view taken from the left side of FIG. 2;

FIG. 4 is a cross-sectional view taken on the line 4—4 of FIG. 2;

FIG. 5 is a cross-sectional view taken on the line 5—5 of FIG. 3;

FIG. 6 is another side elevational view of the nut showing the sidewall; and

FIG. 7 is an end elevational view of another embodiment of thread-cutting nut.

Referring more particularly to the disclosure in the drawing wherein is shown illustrative embodiments of the present invention, FIG. 1 discloses a one-piece thread-cutting nut 10 having an extruded generally cylindrical body 11 with an aperture or passage 12 therethrough, a body flange 13 integral with and positioned at one end of the nut body 11, and a face flange 14 parallel to and joined to the body flange 13 by a sidewall 15. The peripheries 16 and 17 of the body flange 13 and face flange 14, respectively, are shown as hexagonal, but can be varied to accommodate various types of driving tools. The peripheries 16 and 17 also may have differing configurations in order to accommodate more than one type of driving tool.

The nut body aperture 12 is provided with a helical thread 18 therein, and the face flange 14 is provided with a generally central aperture 19 which incorporates a cutting edge 20 on the lead portion of a helical formed thread 21 for initially engaging an unthreaded stud 23 (see FIG. 2). The axis of the thread 21 is approximately the same as the axis of the nut body 11 and the aperture 12 therein. The cutting edge 20 for the thread 21 is defined by a notch 22 formed in the periphery of the aperture 19 and interrupting the thread 21.

If more than one cutting edge is incorporated into the face flange 14' of a nut 10' (see FIG. 7), the edges 20' are defined by notches 22' circumferentially equally spaced around the aperture 19' so as to balance the effects of the several edges 20' upon a stud or the like from the forces used in the application of the nut 10' to the stud. Another desirable consequence of equal spacing of the cutting edges 20' is an equal undertaking of forces or stresses in the equally sized thread portions 21' of the formed helical path.

The nut 10 is applied to a stud or post 23 with the cutting edge 20 and thread 21 cutting or forming threads 24 onto and in the surface of the stud. The threaded stud then enters the aperture 12 and engages the thread 18. Should the axis of the nut 10 when started on the stud 23 not be coincident with the axis of the stud, the nut will continue in an off-axis position until the end of the stud enters the aperture 12 in the nut body 11 and engages the thread 18 therein. At this point, the nut 10 will correct its noncoincidence between its axis and the axis of the stud to which it is being applied, which will distort the initial thread cut on the stud by the cutting edge 20 and cause the thread on the stud to follow the revised helical path of the thread 21 in the face flange 14.

When the stud enters the aperture 12 in the body 11 and engages the thread 18 therein, the axis of the stud 23 and the nut 10 will be coincident and such distortion will not take place during the balance of the application of the nut on the stud. Since the stud 23 to which the nut 10 is applied will, in nearly all cases, have a taper in the portion of the body near the point or free end, and this is where the initial threads will be cut by the cutting edge 20, the depth of the threads engaged by the helical thread 21 in the face flange 14 will be minimal and the distortion, consequently, of these threads will be at a minimum.

An advantage of the present nut is that when the nut 10 is installed upon a stud 23, there is more than one thread engaged with the stud due to the engagement of the thread 21 in the face flange 14 and the engagement of the several threads 18 in the extruded body 11. This nut having the above thread engagement provides exceptional holding capabilities and a very high stripping torque when compared to the driving or installation torque required.

Also, the face flange 14 provides a locking feature for the nut 10. When installed upon a post or stud extending through and retaining plates 25, 26, the interaction between the body flange 13, the sidewall 15, and the face flange 14 engaging the workpiece, is such that a springlike action in the sidewall 15 sets up a distortion of the parallel surfaces of the body flange 13 and the face flange 14.

As this deformation takes place, the single thread 21 in the face Flange 14 strips the last formed thread on the stud 23 and the several threads 18 in the extruded body 11 continue in the helical path of the threads 24 on the stud; and the distortion of the parallelarity between the face flange 14 and the body flange 13 causes, in effect, the axis of the nut 10 to distort the axis of the stud 23 and introduce a slight structural bending condition in the stud. This bending action causes interference and a substantial friction between the threads 24 on the stud 23 and the threads 18 in the body 11 of the nut 10, which in turn causes a locking action and a condition of high resistance to loosening.

I claim:

1. A one-piece thread-cutting nut comprising a nut body having a central threaded aperture therethrough, a body flange integral with and located at one end of the body, a face flange parallel to but spaced from said body flange and nut body, a sidewall joining said body flange and face flange, a generally central aperture in said face flange aligned with said aperture in the nut body, and thread-cutting means in said face flange aperture.

2. A one-piece thread-cutting nut as set forth in claim 1, in which said thread-cutting means includes at least one thread-cutting edge in said face flange aperture, and a helical thread in said aperture extending from the cutting edge.

3. A one-piece thread-cutting nut as set forth in claim 2, in which said cutting edge is formed by a notch in the periphery of the face flange aperture.

4. A one-piece thread-cutting nut as set forth in claim 3, in which the spaced edges of said notch defines the leading edge and the trailing edge of the helical thread.

5. A one-piece thread-cutting nut as set forth in claim 1, in which said thread-cutting means includes a plurality of circumferentially equally spaced cutting edges in the aperture of the face flange, and a helical thread extending from each cutting edge.

6. A one-piece thread-cutting nut as set forth in claim 5, in which said cutting edges are defined by notches formed in the periphery of the face flange aperture, said helical thread extending from the corresponding cutting edge until interrupted by the next succeeding notch.

7. A one-piece thread-cutting nut as set forth in claim 1, in which engagement of said face flange with a member causes distortion of the parallel flanges which in turn causes distortion of the axis of the nut relative to the axis of the member being threaded and provides sufficient bending of the threaded member to introduce binding between the threaded nut and the threaded member.